United States Patent [19]

Zhuchkov et al.

[11] 4,124,442
[45] Nov. 7, 1978

[54] REGULATING ROD DRIVE OF NUCLEAR REACTOR

[76] Inventors: Ivan I. Zhuchkov, ulitsa 22 Partsiezda, 6/2, kv. 60; Vladimir S. Gorjunov, ulitsa Shalyapina, 15, kv. 124; Boris I. Zaitsev, ulitsa Shalyapina, 15, kv. 131; Nikolai E. Derevyankin, ulitsa Sovnarkomovskaya, 30, kv. 115; Vladimir A. Petrov, ulitsa Zhitomirskaya, 9-a, kv. 18; Semen D. Istomin, ulitsa Shalyapina, 20, kv. 60; Davyd I. Kovalenchik, mikroraion Kuznechikha-1, 8, kv. 55; Evgeny A. Arkhipov, ulitsa Petrovskogo, 5, kv. 20; Valery I. Serebryakov, ulitsa Novosovetskaya, 12, kv. 4; Vladimir S. Kachalin, ulitsa Gogolya, 16, kv. 4, all of Gorky, U.S.S.R.

[21] Appl. No.: 795,542

[22] Filed: May 10, 1977

[51] Int. Cl.² .................. G21C 17/00; G21C 7/08
[52] U.S. Cl. .................... 176/36 C; 176/19 R; 176/40
[58] Field of Search ................ 176/36, 19, 40

[56] References Cited

U.S. PATENT DOCUMENTS

| | | | |
|---|---|---|---|
| 3,408,101 | 10/1968 | Savary | 176/36 R |
| 3,494,827 | 2/1970 | Zinn | 176/36 R |
| 3,604,746 | 9/1971 | Notari | 176/36 R |
| 3,733,251 | 5/1973 | Gilbertson et al. | 176/36 C |
| 3,778,345 | 12/1973 | Maslenok et al. | 176/36 R |
| 3,857,599 | 12/1974 | Jones et al. | 176/36 C |
| 4,053,355 | 10/1977 | Vuckovich | 176/36 C |

Primary Examiner—Samuel W. Engle
Assistant Examiner—S. A. Cangialosi
Attorney, Agent, or Firm—Haseltine, Lake & Waters

[57] ABSTRACT

A regulating rod drive of a nuclear reactor, comprising a guide tube and a signalling device to signal the engagement of the drive with the regulating rod, which signalling device is installed in a hermetically sealed housing and includes a spring-loaded sensing rod, whereof one end interacts with the regulating rod, and an armature of a ferromagnetic material. Also placed in said housing and kinematically interconnected are a grip control mechanism comprising a rotary tube coupled to a control pin which controls profiled grips, and a bar driving mechanism having a bar with said profiled grips and a disengaging means including a driving element connected via a self-braking reduction gear to an electromotor arranged outside the hermetically sealed housing and a driven element connected to a gear of a kinematic pair for the conversion of rotative motion into reciprocating motion, whose toothed member is coupled to the bar, the upper portion of said toothed member being placed in a jacket, whereupon there is mounted an inductive transducer of the lower position of the regulating rod, and a means to transmit the torque of the electromotor, which is rigidly coupled to the electromotor shaft, the profiled grips control mechanism and the bar driving mechanism, which is also electromagnetically coupled to the signalling device for signalling the engagement of the drive with the regulating rod and interacts with the guide tube mounted on the drive housing.

18 Claims, 9 Drawing Figures

U.S. Patent  Nov. 7, 1978  Sheet 5 of 5  4,124,442
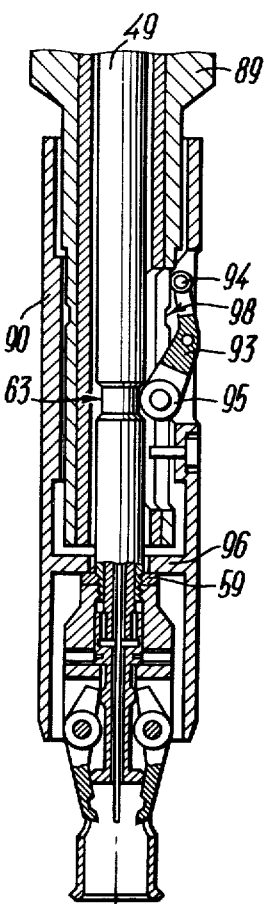
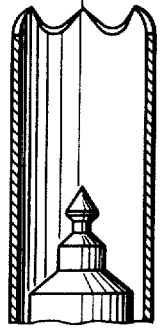
FIG. 6
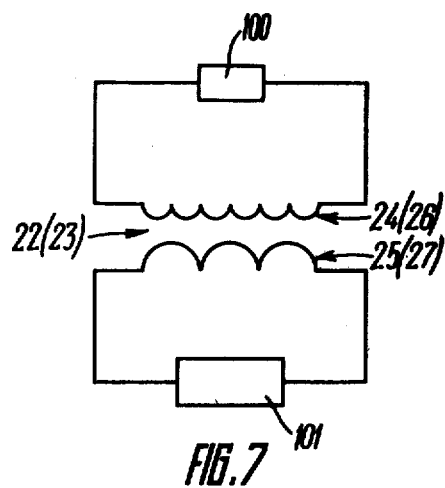
FIG. 7

REGULATING ROD DRIVE OF NUCLEAR REACTOR

The present invention relates to nuclear reactors and, more particularly, to drives of nuclear reactors' regulating rods.

The regulating rod drive of this invention is intended for power control, excess reactivity compensation, and an emergency shut-down of a reactor.

The regulating rod drive according to the invention is to be chiefly used in large commercial reactors at atomic power stations where fuel recharging is carried out without unsealing the reactor vessel, keeping in mind that the latter is essential for fast-neutron reactors cooled with alkali metals and alloys.

Today, the rapid growth of unit capacities of nuclear reactors calls for highly reliable elements of reactor systems. The most critical element of such a system is the drive of a nuclear reactor's regulating rod. At present, designers are facing the task of providing simple and highly reliable drives of this type, which would need no maintenance or repair. This is due to the arduous conditions under which such drives operate, including the effects of aggressive media, high temperatures and radiation, as well as the absence of lubrication and difficulties involved in the inspection and maintenance.

In order to ensure desired core parameters and reliability of a large industrial reactor, it is necessary to employ a large number of regulating rods' drives; however, in order to arrange them within a limited area of the reactor's cover, one must reduce the drives' dimensions to a certain level.

The core is that part of a reactor which contains fuel elements and houses the regulating rods.

The idle time of a reactor during fuel recharging affects the overall efficiency of the reactor and includes the time during which the drives engage with and are disengaged from the regulating rods; a significant part of this time is spent to check the engagement.

There is known a drive of a nuclear reactor's regulating rod, comprising a signalling device to signal the engagement of the drive with the regulating rod, which includes a spring-loaded control rod, whereof one end interacts with the regulating rod, and an armature of a ferromagnetic material. The drive further includes a grips control mechanism comprising a rotary tube connected to a rod which controls profiled grips, a bar driving mechanism having a bar and a disengaging means which comprises a driving element connected via a self-braking reduction gear to an electromotor, and a driven element connected to a gear of a kinematic pair for converting rotative motion into reciprocating motion, whose rack is connected to the bar and arranged in a jacket, whereupon there is mounted an inductive transducer of the lower position of the regulating rod, as well as a guide tube to appropriately direct the regulating rod during its working stroke.

However, the known drive of a nuclear reactor's regulating rod is too complicated in design, which is due to the presence of an individual drive for the bar driving mechanism and the profiled grips control mechanism.

Furthermore, in the known drive, the profiled grips control mechanism is only provided with manual control, which rules out remote control of the engagement of the drive with the regulating rod and necessitates the provision of a sealing unit employing bellows; the latter still further complicates the design and reduces the reliability of the drive.

In the known drive, the bar driving mechanism has no means to protect the drive's kinematic components from overloads, which is another factor affecting the drive's reliability.

The known drive of a nuclear reactor's regulating rod has a special mechanism to drive the guide tubes, which is mounted on the reactor's lid; this accounts for increased dimensions of the reactor, as well as for the fact that the drive is hard to get at during maintenance, assembly or dismantling.

During fuel recharging, the drive of the regulating rod must be disengaged from the regulating rod. The bar with the gripping device must be raised and locked so as to ensure a necessary clearance between the head of the regulating rod and the lower end of the bar.

The known drive of a nuclear reactor's regulating rod does not provide for reliable locking of the bar in the recharging position, because the bar with the regulating rod is dropped by an emergency signal through de-energizing the control winding of the disengaging means; it is impossible in this case to keep the bar in its upper position. As a result, the most convenient position of the bar during recharging is when it rests on a shock absorbing spring. If the bar is raised above that level it may fall and disturb the recharging process. If the bar is below that level it also may hamper the recharging. Two interlocking inductive switches are provided to control the drive bar's position. In case of an improper position of the bar, recharge stop signals are produced.

During recharging, the interlocking switches with electronic units are under voltage and send signals to the control circuit; meanwhile, all the other power-operated units are disconnected from the power source.

The known drive of a nuclear reactor's regulating rod must be provided with two interlocking inductive switches and two electronic units, whereto power must be fed.

The drive bar rests freely on the shock absorbing spring; as a result, removal of the plugs may swing the bar, which, in turn, may actuate the switch and discontinue the recharging. In such a situation, it is necessary to check the mechanisms, bring them back to the recharging state and start the recharging all over again.

In the known drive, the bar must be of a certain weight, depending upon the characteristics of the shock absorbing spring. The idea is to rule out the effect of the static pressure produced by the bar upon the spring which may be deformed and come below the level of the lower interlocking switch, as well as to prevent the bar from hitting the head of the regulating rod as the bar is released in case of an emergency. All these factors account for the complicated design of the drive, prolonged fuel recharging time, complicated recharging control means, and reduced reliability of interlocking the drive bar during fuel recharging.

It takes much time to prepare the known drive of a nuclear reactor's regulating rod for operation prior to the reactor start-up. This accounts for a prolonged shut-down time and reduced efficiency of the reactor. The time for preparing the known drive for operation is determined by the necessity of bringing the regulating rod to its upper position in order to check the engagement. This makes it impossible to simultaneously prepare several drives, or all the drives for operation, as safety requirements stipulate that prior to the start-up of the reactor, the regulating rods are to be withdrawn from the core one by one; more time is required to move the bar over the entire length of its working stroke.

The complexity of the known drive's design is also due to the presence of an individual inductive transducer in the device for controlling the engagement of the drive with the regulating rod.

Finally, the known drive has a great height due to the fact that the magnetic core and spring must be arranged in the upper part of the jacket.

It is an object of the present invention to simplify the drive design.

It is another object of the invention to reduce the dimensions of the drive.

It is still another object of the invention to cut down the fuel recharging time.

It is yet another object of the invention to raise the reliability of the drive.

Finally, it is an object of the invention to make it possible to repair the regulating rods' drives of a nuclear reactor without unsealing the reactor.

The foregoing and other objects of the present invention are attained by providing a drive of a regulating rod of a nuclear reactor, which comprises a guide tube and a hermetically sealed housing, wherein there are installed a signalling device to signal the engagement of the drive with the regulating rod, which includes a spring-loaded sensing rod, whereof one end interacts with the regulating rod, and an armature of a ferromagnetic material, the drive further including a grips control mechanism comprising a rotary tube connected to a pin to control profiled grips, and a bar driving mechanism having a bar and a disengaging means including a driving element connected via a self-braking reduction gear to an electromotor arranged outside the hermetically sealed housing, and a driven element connected to a gear of a kinematic pair for converting rotative motion into reciprocating motion, whose toothed member is connected to the bar and arranged in a jacket, whereupon there is mounted an inductive transducer of the lower position of the regulating rod, which drive has, in accordance with the invention, a means to transmit the torque of the electromotor, rigidly coupled to the shaft of the electromotor, the mechanism for controlling the profiled grips and the bar driving mechanism which is electromagnetically connected to the signalling device to signal the engagement of the drive with the regulating rod, and interacts with the guide tube mounted on the hermetically sealed housing of the drive.

It is expedient that in the proposed regulating rod drive of a nuclear reactor, the means for transmitting the electromotor's torque should comprise a cylinder-shaped casing of a ferromagnetic material with nonmagnetic inserts, housing coaxially arranged shafts, including a drive shaft rigidly coupled to the electromotor's shaft, and driven shafts, one of which is connected to the bar driving mechanism and arranged inside the drive shaft, whereas the other envelops the driving shaft and is connected to the profiled grips control mechanism; it is also expedient that the torque transmitting means should include at least two exciting windings, each being arranged on the outer surface of the cylinder-shaped casing at the level of the nonmagnetic inserts, the number of nonmagnetic inserts being equal to that of exciting windings.

It is further expedient that in the proposed regulating rod drive of a nuclear reactor, the drive shaft of the torque transmitting means should be of a ferromagnetic material and be stepped in the axial direction, one of its steps having two rows of teeth provided on its internal surface and separated by a nonmagnetic insert, whereas the other step has two rows of teeth on the outer surface, the driven shafts of the torque transmitting means also being of a ferromagnetic material, one of these having two rows of teeth on its outer surface, whereas the other has two rows of teeth on its internal surface, separated by a nonmagnetic insert, the teeth of each of the driven shafts being arranged opposite to and at a minimum distance from the respective teeth of the drive shaft, the nonmagnetic inserts of the drive and driven shafts being opposite the nonmagnetic inserts of the cylinder-shaped casing.

It is expedient that in the proposed regulating rod drive of a nuclear reactor, each exciting winding of the means for transmitting the electromotor's torque, arranged in the casing of a ferromagnetic material, should comprise, in coaxial arrangement, a control winding to produce a magnetic flux directed through the drive and one of the driven shafts, and a signal winding to produce a signal when the torque being transmitted is in excess of a predetermined value.

It is advisable that in the proposed regulating rod drive of a nuclear reactor, the bar driving mechanism should be coupled to the guide tube by locking means arranged in grooves provided in the guide tube, each locking means being constructed as a double-arm lever with rollers interacting with helical grooves provided in the bar and the drive casing, and coupled to stops mounted on the bar and guide tube.

It is also advisable that the regulating rod drive of this invention should include an interlocking device to ensure a desired clearance between the regulating rod and the drive in case of fuel recharging, which interlocking device kinematically couples the bar driving mechanism to the profiled grips control mechanism.

It is desirable that in the proposed regulating rod drive of a nuclear reactor, the interlocking device should comprise a claw clutch composed of two half-clutches, and a control bushing, one of the half-clutches being rigidly mounted on the driven element of the disengaging means, whereas the other half-clutch is movable in the axial direction and mounted on the driving element of the disengaging means, the control bushing having helical grooves on its outer surface to receive stationary guide pins, and being connected with one of its ends to the movable half-clutch by means of a ball lock, its other end being coupled by means of teeth to the rotary tube of the profiled grips control mechanism.

It is also desirable that in the proposed regulating rod drive of a nuclear reactor, electromagnetic coupling between the bar driving mechanism and the signalling device to signal the engagement between the drive and the regulating rod is ensured by that the armature, mounted on the opposite end of the spring-loaded sensing rod, interacts with the lower inductive transducer of the bar driving mechanism, depending upon the position of the regulating rod in the profiled grips of the profiled grips control mechanism.

The proposed drive of a nuclear reactor's regulating rod is simpler in design, as compared to the conventional drives of this type, which is due to the presence of the means for transmitting the torque of the electromotor, which makes it possible to control the bar driving mechanism and the grips control mechanism with the aid of a single electromotor arranged outside the hermetically sealed drive housing.

The simplicity of the proposed drive design is also due to the fact that the guide tube is directly driven by the bar driving mechanism, which makes it possible to dispense with a mechanism to be specially used for the purpose.

The proposed regulating rod drive design makes it possible to reduce the dimensions of both the drive and the reactor as a whole.

The invention makes it possible to speed up the preparation of the reactor for operation following a fuel recharging, as well as the preparation for fuel recharging, which cuts down the idle time and raises the reactor's efficiency. The speed-up is due to the fact that the engagement of the drive with the regulating rod is checked in the lower position of the regulating rod, owing to the interaction of the armature, mounted on the spring-loaded sensing rod, with the inductive transducer of the lower position of the regulating rod.

Besides, the invention raises the realiability of the regulating rod's drive because the means for transmitting the torque of the electromotor also performs the functions of protecting the drive's components from excessive overloads during operation and disconnects the electromotor if the latter's torque is in excess of a predetermined value.

The invention ensures reliable locking of the bar with the guide tube in the recharging position, which is due to the interlocking of the driving and driven elements of the disengaging means during release of the profiled grips as the drive is being disengaged from the regulating rod.

The invention makes it possible to repair the drive of a nuclear reactor's regulating rod without withdrawing it from the reactor, which is due to the fact that the electromotor and exciting windings of the torque transmitting means are located outside the hermetically sealed housing of the drive.

Other objects and advantages of the present invention will become more apparent from the following detailed description of a preferred embodiment thereof to be read in conjunction with the accompanying drawings, wherein:

FIGS. 1 and 1¹ are elevation views of a regulating rod's drive of a nuclear reactor engaged with the regulating rod, in accordance with the invention;

Figure 5:
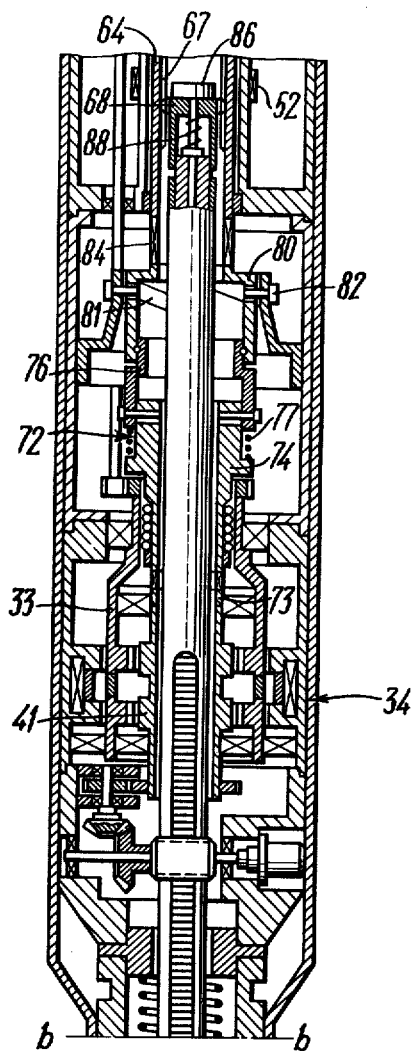
Figure 5:
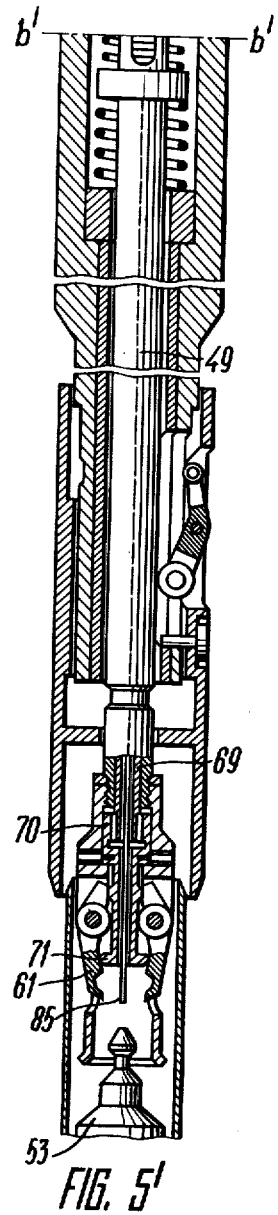
Figure 4:
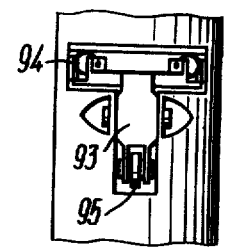
FIG. 4 is a view of FIG. 1 taken in the direction of the arrow A.

FIGS. 5 and 5¹ are elevation views of the lower portion of the regulating rod's drive of a nuclear reactor, disengaged from the regulating rod, in accordance with the invention;

FIG. 6 is an elevation view of the lower portion of the regulating rod's drive of a nuclear reactor in the recharging position, in accordance with the invention;

FIG. 7 is a circuit diagram of the exciting winding, in accordance with the invention.

Figure 1:
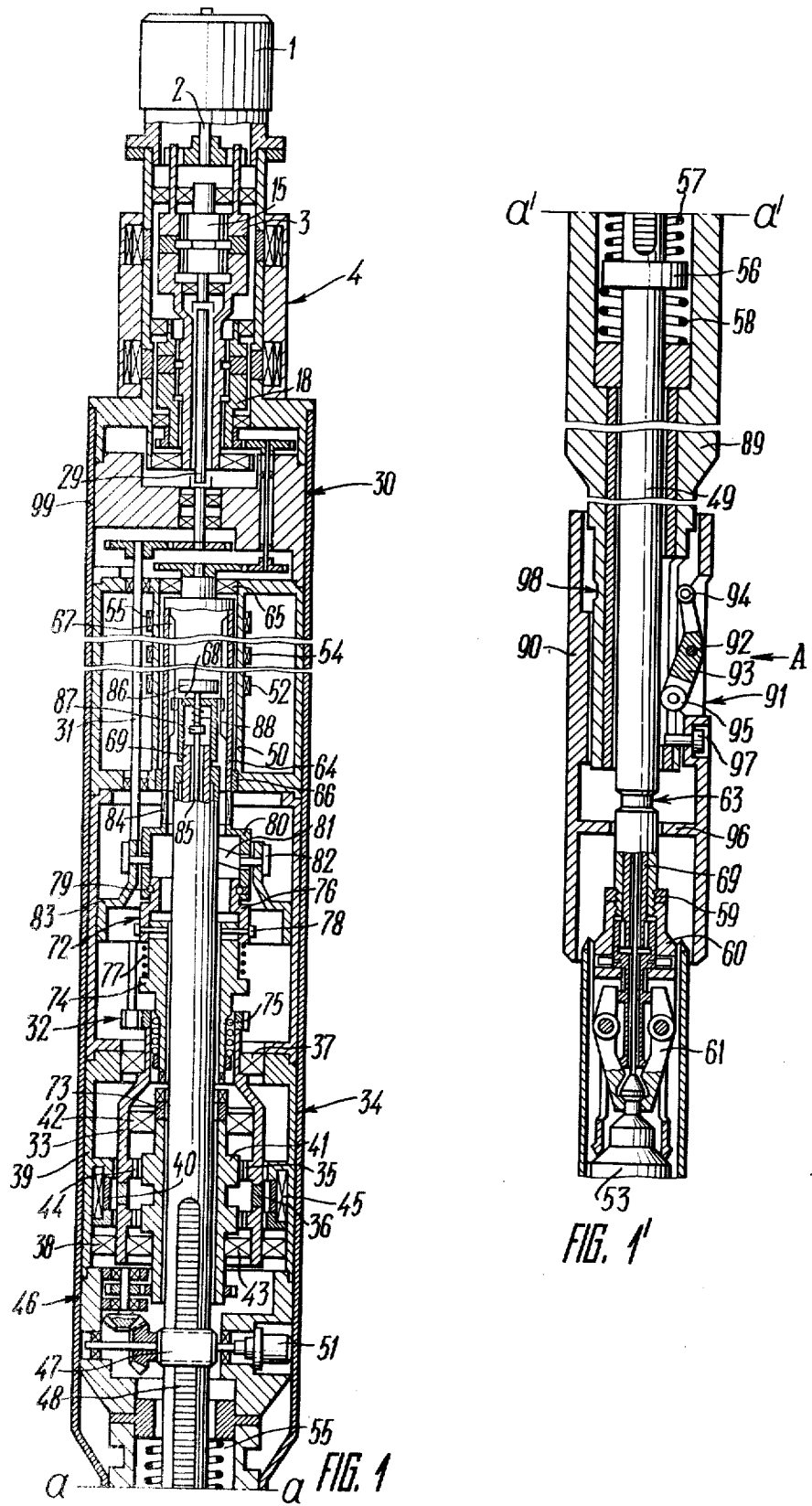
Figure 2:
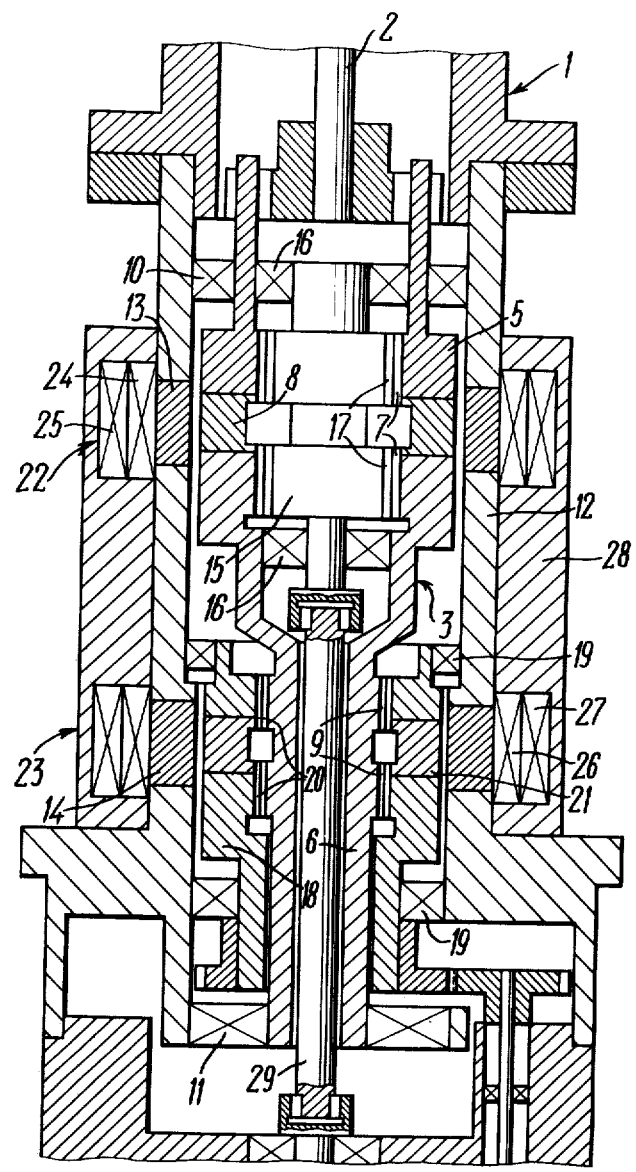
FIG. 2 is an elevation view of the means for transmitting the torque of the electromotor, in accordance with the invention.

Referring now to the attached drawings, the proposed regulating rod's drive of a nuclear reactor comprises an electromotor 1 (FIGS. 1 and 2) whose shaft 2 is rigidly coupled to a drive shaft 3 of a means 4 (FIG. 1) for transmitting the torque of the electromotor 1 (FIGS. 1 and 2). The drive shaft 3 is composed of two portions of a ferromagnetic material and a portion of a nonmagnetic material, interposed between the two portions of a ferromagnetic material. The shaft 3 is stepped and has two steps, 5 and 6 (FIG. 2). The step 5 has two rows of teeth 7 provided on its internal surface, separated by said nonmagnetic portion which will be now referred to as a nonmagnetic insert 8.

The second step 6 also has two rows of teeth 9 provided on its outer surface. The drive shaft 3 (FIGS. 1 and 2) is mounted with the aid of bearings 10 and 11 (FIG. 2) in a cylinder-shaped housing 12. The housing 12 is composed of alternating portions of a ferromagnetic material and a non-magnetic material; the latter portions are referred to as nonmagnetic inserts 13 and 14. A driven shaft 15 (FIGS. 1 and 2) of the means 4 (FIG. 1) is arranged inside the drive shaft 3 (FIGS. 1 and 2), coaxially with the latter. The driven shaft 15 is mounted in bearings 16 at the level of the step 5 (FIG. 2). The driven shaft 15 is of a ferromagnetic material and provided with two rows of teeth 17 (FIG. 2) on its outer surface. A second driven shaft 18 (FIGS. 1 and 2) is mounted in bearings 19 (FIG. 2) inside the cylinder-shaped housing 12 and envelops the drive shaft 3 (FIGS. 1 and 2) at the level of the latter's second step 6 (FIG. 2).

The driven shaft 18 (FIGS. 1 and 2) is also composed of two portions of a ferromagnetic material and a portion of a nonmagnetic material interposed between the two portions of ferromagnetic material and has two rows of teeth 20 (FIG. 2) on its internal surface, which are separated by said non-magnetic portion which will be referred to below as a non-magnetic insert 21. The teeth 17 of the driven shaft 15 and the teeth 20 of the driven shaft 18 are arranged at a minimum distance from and opposite the teeth 7 and 9, respectively, of the drive shaft 3. The nonmagnetic insert 8 of the drive shaft 3 and the nonmagnetic insert 21 of the driven shaft 18 are respectively arranged opposite the nonmagnetic inserts 13 and 14 of the cylinder-shaped housing 12. On the outer surface of the cylinder-shaped housing 12, at the level of the nonmagnetic insert 13, there is mounted an exciting winding 22; at the level of the nonmagnetic insert 14 there is mounted an exciting winding 23; the exciting winding 22 comprises a control winding 24 which produces a magnetic flux penetrating through the drive shaft 3 (FIGS. 1 and 2) and the driven shafts 15 and 18. The winding 22 also includes a signal winding 25 (FIG. 2) which produces a signal to stop the electromotor 1 (FIGS. 1 and 2) if its torque is in excess of a predetermined value.

The winding 23 is similar to the winding 22 and also comprises a control winding 26 and a signal winding 27. The exciting windings 22 and 23 (FIG. 2) are arranged in a casing 28. The driven shaft 15 (FIGS. 1 and 2) of the means 4 (FIG. 1) is rigidly coupled with the aid of a connection shaft 29 (FIGS. 1 and 2) and through a self-braking reduction gear 30 (FIG. 1), a shaft 31 and a spur-gear drive 32 to a driving element 33 of a disengaging means 34.

The driving element 33 of the disengaging means 34 is similar to the step 5 (FIG. 2) of the drive shaft 3 (FIGS. 1 and 2) and has two rows of teeth 35 (FIG. 1) on its internal surface, which are separated by a nonmagnetic insert 36. The driving element 33 is mounted in bearings 37 and 38 in a casing 39 of the disengaging means 34. The casing 39 is composed of two portions of a ferromagnetic material, wherebetween there is interposed a portion of a nonmagnetic material, which will be referred to as a nonmagnetic insert 40. A driven element 41 of the disengaging means 34 is mounted inside the driving element 33, coaxially with the latter, in bearings 42 and 43.

The driven element 41 is similar to the driven shaft 15 (FIGS. 1 and 2) of a ferromagnetic material and has two rows of teeth 44 (FIG. 1).

The teeth 44 of the driven element 41 of the disengaging means 34 are arranged, according to the invention, opposite to and at a minimum distance from the teeth 35 of the driving element 33. The nonmagnetic insert 36 of the driving element 33 is arranged opposite the nonmagnetic insert 40 of the casing 39. In the casing 39, at the level of the nonmagnetic insert 40, there is arranged a control winding 45.

The driven element 41 of the disengaging means 34 is coupled through a cylindrical-conical gear 46 to a gear 47 of a reciprocating pair, whose toothed member, referred to as a rack 48, is coupled to a bar 49 (FIGS. 1 and 1¹). The upper portion of said toothed member is placed in a jacket 50 (FIG. 1).

Mounted on the same shaft with the gear 47 is a transducer 51 of the position of the bar 49 (FIGS. 1 and 1¹). Mounted on the jacket 50 (FIG. 1) are an inductive transducer 52 of the lower position of a regulating rod 53 (FIG. 1¹), an inductive transducer 54 (FIG. 1) of the upper position of said regulating rod 53 (FIG. 1), and an inductive transducer 55 (FIG. 1) of the recharging position. On the upper portion of the bar 49 (FIGS. 1 and 1¹) there is rigidly mounted a bushing 56 (FIG. 1¹), whereof one end abuts against a spring 57, whereas its other end abuts against a shock absorbing spring 58.

Figure 3:
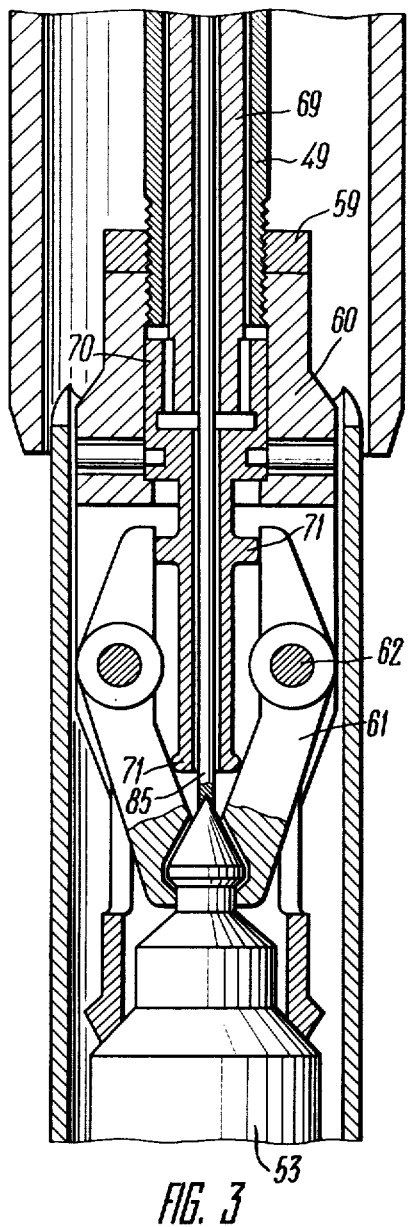
FIG. 3 is an elevation view of the lower portion of the bar engaged with the regulating rod, in accordance with the invention.

Mounted on the lower portion of the bar 49 (FIGS 1¹ and 3) are a stop 59 and a head 60 with profiled grips 61 mounted, in turn, on axles 62 (FIG. 3). The lower portion of the bar 49 is also provided with a ring groove 63 (FIG. 1¹).

The connection shaft 29 (FIG. 1), the shaft 31, the spur-gear drive 32, the disengaging means 34, the cylindrical-conical gear 46, the gear 47 with the rack 48 of the reciprocating kinematic pair, the bar 49 (FIGS. 1 and 1¹), the jacket 50 (FIG. 1), the transducer 51, the inductive transducers 52, 54 and 55, the bushing 56 (FIG. 1¹), the spring 57, the shock absorbing spring 58, and the head 60 with the profiled grips 61 make up a mechanism for driving the bar 49 (FIGS. 1 and 1¹).

The driven shaft 18 (FIG. 1) of the means 4 for transmitting the torque of the electromotor 1 is coupled through the self-braking reduction gear 30 to a rotary tube 64 arranged in the jacket 50 in bearings 65 and 66. On the internal surface of the rotary tube 64 there are mounted two feather keys 67 whose length corresponds to that of the working stroke of the regulating rod 53 (FIG. 1¹). Inside the rotary tube 64 (FIG. 1) there is installed a bushing 68 provided with slots to receive the feather keys 67, said bushing 68 being rigidly coupled to a control pin 69 (FIGS. 1 and 3) extending inside the rack 48 (FIG. 1) and bar 49 (FIGS. 1. and 3). On the lower end of the control pin 69 is rigidly mounted a tip 70 (FIG. 3) with cams 71 arranged at different levels and at an angle of 90° with respect to each other. The cams 71 are located at the level of the respective arms of the profiled grips 61 (FIG. 1¹).

The self-braking reduction gear 30 (FIG. 1), the rotary tube 64, the feather keys 67, the bushing 68, the control pin 69 and the tip 70 with the cams 71 make up a mechanism for controlling the profiled grips 61 (FIG. 1¹).

The mechanism for driving the bar 49 (FIGS. 1 and 1¹) and the mechanism for controlling the profiled grips 61 (FIG. 1¹) are kinematically interconnected by an interlocking means 72.

The interlocking means 72 comprises two half-clutches 73 and 74 of the claw type. The claw half-clutch 73 is rigidly mounted on the driven element 41 of the disengaging means 34, whereas the claw half-clutch 74 is movable in the axial direction, being mounted with the aid of a ball key 75 on the driving element 33 of the disengaging means 34. On the half-clutch 74 there are mounted a locking bushing 76 and a spring 77. The half-clutch 74 and the locking bushing 76 are axially movable with respect to each other. The extent of their relative movement is limited by pins 78. The half-clutch 74 is coupled by means of a ball lock 79 to a control bushing 80. The control bushing 80 is provided with helical grooves 81 on its outer surface, which receive guide pins 82 fixed in a casing 83 of the interlocking means 72. The control bushing 80 is coupled by means of end face teeth 84 to the rotary tube 64 of the mechanism for controlling the profiled grips 61 (FIG. 1¹).

Inside the control pin 69 (FIG. 1) of the mechanism for controlling the profiled grips 61 (FIG. 1¹) there is arranged a sensing rod 85 (FIGS. 1 and 3) on whose upper end there are mounted an armature 86 (FIG. 1) of a ferromagnetic material, a stop 87 and a spring 88. One end of the spring 88 abuts against the stop 87 of the sensing rod 85, whereas its other end abuts against the bushing 68 of the mechanism for controlling the profiled grips 61 (FIG. 1¹).

The control rod 85 (FIG. 1), the armature 86 and the spring 88 make up a signalling means to signal the engagement of the drive with the regulating rod 53 (FIG. 1¹). The bar 49 is arranged inside a casing 89 connected to the reduction gear 46 (FIG. 1). On the casing 89 (FIG. 1¹) there is mounted a guide tube 90 provided with grooves 91 which receive axles 92. Double-arm levers 93 (FIGS. 1¹ and 4) with rollers 94 and 95 are mounted on the axles 92. On the internal surface of the guide tube 90 (FIG. 1¹) there is provided a stop 96. On the guide tube 90 there are also mounted limiting pins 97. The casing 89 is provided with a groove 98 to receive the rollers 94 of the lever 93. The signalling means, the mechanism for driving the bar 49 (FIGS. 1 and 1¹) and the mechanism for controlling the profiled grips 61 (FIG. 1¹) are arranged inside a hermetically sealed housing 99 (FIGS. 1) mounted on the reactor's lid (not shown).

FIGS. 5 and 5¹ show the lower portion of the drive of the regulating rod 53. The drive and regulating rod 53 are didisengaged. The cams 71 are at an angle of 90° relative to each other, the profiled grips are driven apart, the regulating rod 53 is released from the profiled grips 61 and the head 60. The sensing 85 extends beyond the lower end face of the tip 70. The armature 86 is on the upper end face of the bushing 68.

FIG. 6 shows the lower portion of the drive of the regulating rod 53 in the recharging position.

FIG. 7 is a circuit diagram of the exciting winding 22 /23/(FIGS. 2 and 7). The control winding 24 /26/ (FIG.7) is connected to a d.c. source 100. The signal winding 25 /27/ is directly connected to a control unit 101 placed in the control circuit (not shown) of the electromotor 1 (FIGS. 1 and 2).

When the reactor is in operation, the drive of the regulating rod 53 (FIGS. 1¹ and 3) is coupled to the latter and moves it in the reactor's core at a certain speed intended to maintain a desired power of the reactor and compensate the fuel burn-up. To set the regulating rod 53 in motion, voltage is applied to the electromotor 1 (FIGS. 1 and 2); at the same time voltage is applied from the d.c. source 100 (FIG. 7) to the control winding 24 (FIGS. 2 and 7) of the means 4 (FIGS. 1 and 2) for transmitting the torque of the electromotor 1 (FIGS. 1 and 2). This voltage produces a magnetic flux which penetrates through the teeth 7 (FIG. 2) of the drive shaft 3 (FIGS. 1 and 2) and the teeth 17 (FIG. 2) of the driven shaft 15 (FIGS. 1 and 2). Thus the magnetic flux magnetically connects the drive shaft 3 to the driven shaft 15. Hence, as supply voltage is applied to the electromotor 1, rotation of the shaft 2 of the electromotor 1 is transmitted to the drive shaft 13 and the driven shaft 15 of the means 4 for transmitting the torque of the electromotor 1. From the driven shaft 15, rotation is transmitted through the connection shaft 29, the self-braking reduction gear 30 (FIG. 1), the shaft 31 and the spur-gear drive 32 to the driving element 33 of the disengaging means 34. As voltage is applied to the electromotor 1, it is also applied to the control winding 45 of the disengaging means 34. This produces a magnetic flux which penetrates through the teeth 35 of the driving element 33 and the teeth 44 of the driven element 41 of the disengaging means 34. As a result, the driving element 33 and the driven element 41 ar magnetically interconnected.

Thus from the driving element 33, rotation is transmitted to the driven element 41 of the disengaging means 34.

From the driven element 41 of the disengaging means 34, rotation is transmitted through the cylindrical-conical gear 46 to the gear 47 of the reciprocating kinematic pair which converts rotative motion of the gear 47 into reciprocating motion of the rack 48 of said kinematic pair. The rack 48 is rigidly connected to the bar 49 (FIGS. 1, 1¹ and 3) through the head 60 (FIGS. 1¹ and 3) and the profiled grips 61 which hold the regulating rod 53. The rack 48 moves said regulating rod 53 within the confines of the reactor's core. The position of the regulating rod 53 in the reactor's core is determined by the transducer 51 (FIG. 1). When the regulating rod 53 (FIG. 1) reaches its extreme working positions, the electromotor 1 is disconnected by signals of the inductive transducer 52 (FIG. 1) of the lower position and the inductive transducer 53 of the upper position of said regulating rod 53, which transducers interact with the armatures 86 of the signalling means to signal the engagement of the drive with the regulating rod 53 (FIG. 1¹).

In case an emergency signal is produced and it is necessary to shut down the reactor, the control winding 45 (FIG. 1) of the disengaging means 34 is de-energized, which breaks the magnetic connection between the driving element 33 and the driven element 41. The cylindrical-conical gear 46 and the rack 48-gear 47 pair are not self-braking, so the bar 49 (FIGS. 1 and 1¹) with the regulating rod 53 (FIG. 1¹) is forced down by its own weight and the compressed spring 57; the regulating rod 53 is introduced into the reactor's core at a preset speed. As this takes place, the gears of the cylindrical-conical reducer 46 (FIG. 1) and the driven element 41 of the disengaging means 34 are in rotation. Meanwhile, the driving element 33 is at rest, as it is coupled to the self-braking reduction gear 30. The impact of the bar 49 and the regulating rod 53 is taken by the shock absorbing spring 58. A rebound of the regulating rod 53 is countered by an overrunning clutch (not shown) interposed between the driving element 33 (FIG. 1) and the driven element 41 of the disengaging means 34. As the control winding 45 of the disengaging means 34 is re-energized, the driving element 33 and the driven element 41 are again magnetically coupled, so the operation proceeds as described above.

If the torque of the shaft 2 (FIGS. 1 and 2) of the electromotor 1 exceeds a predetermined value due to an increased tractive resistance of the regulating rod 53 (FIG. 1¹), the driven shaft 15 (FIGS. 1 and 2) of the means 4 stops, while the drive shaft 3 continues to rotate at the speed of the shaft 2 of the electromotor 1. As this takes place, the teeth 7 (FIG. 2) of the drive shaft 3 (FIGS. 1 and 2) move relative to the teeth 17 (FIG. 2) of the driven shaft 15 (FIGS. 1 and 2), which changes the clearance between said teeth. The change in the clearance brings about a changed resistance to the magnetic flux passing through the teeth 7 and 17. Thus the magnetic field, which is constant during normal operation, now becomes variable and induces variable voltage in the signal winding 25 (FIG. 2), applied to the control unit 101 (FIG. 7). The control unit 101, which is placed in the control circuit of the electromotor 1 (FIGS. 1 and 2), disconnects the supply voltage from the electromotor 1, and the drive is brought to rest. The value of torque of the shaft 2, at which the electromotor is disconnected, is determined by the strength of the kinematic components of the drive.

When the reactor's core is to be recharged, the drive is disengaged from the regulating rod 53 (FIG. 5¹). For this purpose, the regulating rod 53 is lowered. The control winding 24 (FIG. 2) of the means 4 is de-energized, whereas voltage is applied to the control winding 26 (FIG. 2). This produces a magnetic flux which penetrates the teeth 9 (FIG. 2) of the drive shaft 3 (FIGS. 1 and 2) and the teeth 20 (FIG. 2) of the driven shaft 18 (FIGS. 1 and 2), so that the drive shaft 3 and the driven shaft 18 are magnetically coupled. Thus, as supply voltage is applied to the electromotor 1, rotation of the shaft 2 is transmitted to the drive shaft 3 and the driven shaft 18 of the means 4. From the driven shaft 18, rotation is transmitted through the self-braking reduction gear 30 (FIG. 1) to the rotary tube 64 (FIG. 5), and through the guide pins 67 to the bushing 68 and the control pin 69 (FIG. 5¹) with the tip 70 and the cams 71.

As the cams 71 are turned through an angle of about 90°, the profiled grips 61 are driven apart, releasing the regulating rod 53. As this takes place, the interlocking means 72 (FIG. 5) is brought into play, because the rotating tube 64 rotates the control bushing 80 which also moves in the axial direction, as the pins 82 slide in its helical grooves 81. The control bushing 80 moves in the axial direction the locking bushing 76 which, in turn, acts through the spring 77 upon the movable claw-type half-clutch 74 and brings it into engagement with the stationary claw-type half-clutch 73, whereby the driving element 33 and the driven element 41 of the disengaging means 34 are rigidly coupled. If rotation of the tube 64 does not bring the half-clutches 73 and 74 into engagement, the spring 77 is compressed. As soon as the driving element 33 (FIG. 5) and the driven element 41 of the disengaging means 34 are displaced relative to each other so as to engage the cams of the half-clutches 73 and 74 and as the bar 49 (FIG. 5¹) is being lifted, the spring brings the half-clutches 73 and 74 into engagement and rigidly couples the driving element 33 and the driven element 41. The bar 49 (FIGS. 1 and 5¹) is locked in the self-braking reduction gear 30 (FIG. 1).

In order to check the disengagement of the drive from the regulating rod 53 (FIG. 5¹), the bar 49 is moved upwards until the inductive transducer 52 (FIG. 5) of the lower position of the regulating rod 53 (FIG. 5¹) is actuated. As the bar 49 is raised, the control rod 85 is lowered under the action of the spring 88 (FIG. 5), so that the armature 86 abuts against the bushing 68. In order to produce a signal to the effect that the transducer 52 (FIGS. 1 and 5) has been actuated, the bar 49 must be raised higher, as compared to its position in engagement with the regulating rod 53 (FIGS. 1¹ and 5¹) by the clearance value between the end faces of the armature 86 (FIG. 1) and the bushing 68. The travel of the bar 49 over this distance (the clearance between the armature 86 and the bushing 68) is registered by the transducer 52. This value is indicative of the presence of engagement.

In order to recharge the reactor's core, the bar 49 (FIG. 6) is disengaged and raised to its upper working position. The groove 63 of the bar 49 is now opposite the roller 95, and the stop 59 reaches the stop 96 on the guide tube 90. As the bar 49 continues to move upwards, the stop 59 on the bar 49 acts upon the stop 96 of the guide tube 90 and moves said guide tube 90 upwards. The roller 95 of the lever 93 is received in the groove 63 of the bar 49, whereas the roller 94 leaves the groove 98 on the casing 89, so that the guide tube 90 is free to move upwards. Thus bar 49 and the guide tube 90 move up to assume the recharging position, in which the bar 49 is stopped as the electromotor 1 (FIG. 1) is disconnected by a signal of the recharging position transducer 55.

This is followed by de-energizing all the power-operated components of the drive, except the inductive transducer 55 of the recharging position, which produces a recharging signal.

Following the recharging, the drive of the regulating rod of the nuclear reactor is brought to its working state (in this case, the sequence of events is reversed).

The regulating rod's drive of a nuclear reactor in accordance with this invention ensures reliable operation of the reactor throughout its expected life and properly holds the bar 49 (FIG. 1) with the guide tube 90 (FIG. 1¹) in place during a recharging of the reactor's core. It is quite easy to assemble or dismantle the drive.

The manufacture of the drive requires no special materials or equipment, and the manufacturing costs are relatively low.

What is claimed is:

1. A drive of a regulating rod of a nuclear reactor, comprising:
   an electromotor having an output shaft;
   a means for transmitting the torque of said electromotor, kinematically coupled to said output shaft of said electromotor;
   a hermetically sealed housing;
   a connection shaft arranged in said hermetically sealed housing and kinematically coupled to said torque transmitting means;
   a self-braking reduction gear arranged in said hermetically sealed housing and kinematically coupled to said torque transmitting means of said electromotor;
   a bar;
   a mechanism for driving said bar, arranged in said hermetically sealed housing and kinematically coupled to said self-braking reduction gear;
   a casing;
   profiled grips mechanically connected to said bar of said bar driving mechanism;
   a spur-gear drive of said mechanism for driving said bar, kinematically coupled to said self-braking reduction gear;
   a disengaging means of said bar driving mechanism, kinematically coupled to said self-braking reduction gear;
   a casing of said disengaging means;
   a driving element of said disengaging means, arranged in the latter's casing and kinematically coupled to said self-braking reduction gear having an internal cavity;
   a driven element of said disengaging means, arranged in said internal cavity of said driving element and having an internal cavity;
   said bar being arranged in said internal cavity of said driven element;
   a kinematic pair for converting rotative motion into reciprocating motion of said mechanism for driving said bar, arranged in said hermetically sealed housing of said drive;
   a gear of said kinematic pair, connected to said driven element;
   a toothed member of said kinematic pair, the teeth being provided on its outer surface;
   said toothed member being rigidly coupled to said bar and engaged with said gear;
   a jacket housing the upper portion of said toothed member;
   an inductive transducer of the lower position of said regulating rod of said mechanism for driving said bar, mounted on said jacket;
   a mechanism for controlling said profiled grips, arranged in said hermetically sealed housing of said drive and kinematically coupled to said self-braking reduction gear and said bar driving mechanism;
   a rotary tube of said mechanism for controlling said profiled grips, coaxially interposed between said toothed members and said jacket;
   a control pin of said mechanism for controlling said profiled grips, arranged inside said toothed member, one of its ends being rigidly connected to said rotary tube, whereas its other end is connected to said profiled grips to control them;
   a signalling means to signal the engagement of said drive with said regulating rod, arranged in said hermetically sealed housing of said drive and electromagnetically coupled to said bar driving mechanism;
   an armature of said signalling means, interacting with said inductive transducer of the lower position of said regulating rod;
   a spring-loaded sensing rod of said signalling means, whereof one end interacts with said regulating rod;
   a guide tube mounted on said hermetically sealed housing of said drive and interacting with said bar driving mechanism.

2. A drive of a regulating rod of a nuclear reactor as claimed in claim 1, wherein in order to ensure electromagnetic coupling between said bar driving mechanism and said signalling means to signal the engagement of the drive with said regulating rod, said armature of said signalling means is mounted on the opposite end of said spring-loaded sensing rod and interacts with said inductive transducer of the lower position of said regulating rod of said bar driving mechanism, depending on the position of said regulating rod in said profiled grips.

3. A drive of a regulating rod of a nuclear reactor as claimed in claim 1, wherein said means for transmitting the torque of said electromotor comprises:
   a casing;
   a first portion of said casing;
   a second portion of said casing;
   a third portion of said casing;
   said first, second and third portions of said casing being of a ferromagnetic material;
   a first nonmagnetic portion of said casing;
   a second nonmagnetic portion of said casing;
   said casing being composed of alternately arranged said first, second and third portions of a ferromagnetic material and said first and second portions of a nonmagnetic material;
   said alternate portions being adjacent to one another;
   a hollow drive shaft;
   a first portion of said hollow drive shaft;
   second portion of said hollow drive shaft;
   said first and second portions of said drive shaft being of a ferromagnetic material;
   a nonmagnetic portion of said drive shaft, interposed between said first and second portions of a ferromagnetic material;
   said first and second portions of a ferromagnetic material and said nonmagnetic portion being arranged one above the other in the axial direction;
   said drive shaft being arranged in said casing;
   said drive shaft having one of its ends rigidly coupled to said output shaft of said electromotor;
   the outer surface of said hollow drive shaft;
   the internal surface of said hollow drive shaft;
   a first driven shaft arranged inside said drive shaft and coupled with the aid of said connection shaft and through said self-braking reduction gear and spur-gear drive to said driven element of said disengaging means above said bar driving mechanism;
   a second driven shaft enveloping the opposite end of said drive shaft and coupled through said self-braking reduction gear to said rotary tube of said mechanism for controlling said profiled grips;
   at least two exciting windings, each being mounted on said outer surface of said casing at the level of the respective nonmagnetic portion;
   the number of said nonmagnetic portions of said casing being equal to that of said exciting windings.

4. A drive of a regulating rod of a nuclear reactor as claimed in claim 1, comprising:
   at least two locking means to couple said bar driving mechanism to said guide tube;
   a lever of each of said locking means;
   a first roller of said locking means, coupled to said lever;
   a second roller of said locking means, coupled to said lever;
   grooves provided in said guide tube, the number of said grooves being equal to that of said locking means;
   axles of each of said locking means, arranged in said grooves;
   said levers with said rollers being mounted on said axles;
   a first ring groove provided in said bar;
   said first roller interacting with said first ring groove;
   a second ring groove provided in said casing of said bar;
   said second roller interacting with said second ring groove;
   a first stop, provided on said bar;
   a second stop, provided on said guide tube;
   said stops interacting with each other to ensure said connection of said bar driving mechanism to said guide tube.

5. A drive of a regulating rod of a nuclear reactor as claimed in claim 1, wherein provision is made for an interlocking means to provide a required clearance between said regulating rod and said drive in the course of fuel recharging of said nuclear reactor, which kinematically couples said mechanism for driving said bar to said mechanism for controlling said profiled grips.

6. A drive of a regulating rod of a nuclear reactor as claimed in claim 5, wherein said interlocking means comprises:
   a casing;
   a first claw-type half-clutch arranged in said casing and rigidly mounted on said driven element of said disengaging means;
   a second claw-type half-clutch arranged in said casing and movably mounted on said driving element of said disengaging means, said second half-clutch being adapted for movement in the axial direction;
   a control bushing fitted over said second half-clutch and having an outer surface;
   at least two helical grooves provided on said outer surface of said control bushing;
   guide pins in a number corresponding to that of said helical grooves, fixed in said casing and received in said helical grooves;
   a ball lock;
   said ball lock coupling said control bushing to said second half-clutch;
   end-face teeth provided in said control bushing;
   said end-face teeth coupling said control bushing to said rotary tube of said mechanism for controlling said profiled grips.

7. A drive of a regulating rod of a nuclear reactor as claimed in claim 3, wherein said drive shaft of said means for transmitting the torque of said electromotor is stepped in the axial direction and comprises:
   a first step which is the first of said ends of said drive shaft, within which said nonmagnetic portion of said drive shaft is located;
   a second step which is the second of said ends of said drive shaft;
   a first row of teeth of said first step;
   a second row of teeth of said first step;
   said first and second rows of said teeth being provided on said internal surface of said drive shaft, within the limits of said first step;
   said first and second rows of teeth being arranged on both sides of said nonmagnetic portion in the axial direction;
   a first row of teeth of said second step;
   a second row of teeth of said second step;
   said first and second rows of teeth being provided on said outer surface of said drive shaft within the limits of said second step;
   said first driven shaft of said torque transmitting means being of a ferromagnetic material and having an outer surface;
   a first portion of said second driven shaft;
   a second portion of said second driven shaft;

said first and second portions of said second driven shaft being of a ferromagnetic material;

a nonmagnetic portion of said second driven shaft, interposed between said first and second portions of a ferromagnetic material;

said first and second portions of a ferromagnetic material and said nonmagnetic portion being axially arranged one above the other;

an internal surface of said second driven shaft;

a first row of teeth of said second driven shaft;

a second row of teeth of said second driven shaft;

said first and second rows of teeth being provided on said internal surface of said second driven shaft and arranged on both sides of said nonmagnetic portion in the axial direction;

said rows of said teeth of the respective first and second driven shafts being arranged opposite to and at a minimum distance from said respective rows of said teeth of said respective steps of said drive shaft;

said nonmagnetic portion of said drive shaft and said nonmagnetic portion of said second driven shaft being arranged opposite said respective first and second nonmagnetic portions of said casing.

8. A drive of a regulating rod of a nuclear reactor as claimed in claim 3, wherein each said exciting winding of said means for transmitting the torque of said electromotor comprises:

a control winding producing a magnetic flux which penetrates through said drive shaft and one of said driven shafts;

a signal winding enveloping said control winding and producing a signal if the torque of said electromotor is in excess of a predetermined value;

a casing of a ferromagnetic material, enveloping said control winding and signal winding.

9. A drive of a regulating rod of a nuclear reactor as claimed in claim 3, comprising:

at least two locking means to effect said coupling of said bar driving mechanism to said guide tube;

a lever of each of said locking means;

a first roller of said locking means, coupled to said lever;

a second roller of said locking means, coupled to said lever;

grooves in a number corresponding to that of said locking means, provided in said guide tube;

axles of each of said locking means, arranged in said grooves;

said levers with said rollers being mounted on said axles;

a first ring groove provided in said bar;

said first roller interacting with said first ring groove;

a second ring groove provided in said casing of said bar;

said second roller interacting with said second ring groove;

a first stop provided on said bar;

a second stop provided on said guide tube;

said stops interacting with each other and effecting said coupling of said mechanism for driving said bar to said guide tube.

10. A drive of a regulating rod of a nuclear reactor as claimed in claim 3, including an interlocking means to provide a required clearance between said regulating rod and said drive in the course of recharging said nuclear reactor, which kinematically couples said mechanism for driving said bar to said mechanism for controlling said profiled grips.

11. A drive of a regulating rod of a nuclear reactor as claimed in claim 3, wherein said interlocking means comprises:

a casing;

a first claw-type half-clutch arranged in said casing and rigidly mounted on said driven element of said disengaging means;

a second claw-type half-clutch arranged in said casing and movably mounted on said driving element of said disengaging means, said second half-clutch being movable in the axial direction;

a controlling bushing fitted over said second half-clutch and having an outer surface;

at least two helical grooves provided on said outer surface of said control bushing;

guide pins in a number corresponding to that of said helical grooves, fixed in said casing and received in said helical grooves;

a ball lock;

said ball lock coupling said control bushing to said second half-clutch;

end-face teeth provided in said control bushing;

said end-face teeth coupling said control bushing to said rotary tube of said mechanism for controlling said profiled grips.

12. A drive of a regulating rod of a nuclear reactor as claimed in claim 7, wherein each of said exciting windings of said means for transmitting the torque of said electromotor comprises:

a control winding producing a magnetic flux which penetrates through said drive shaft and one of driven shafts;

a signal winding enveloping said exciting winding and producing a signal when the torque of said electromotor is in excess of a predetermined value;

a casing of a ferromagnetic material, enveloping said control winding and signal winding.

13. A drive of a resulating rod of a nuclear reactor as claimed in claim 12, comprising:

at least two locking means to effect said coupling of said mechanism for driving said bar to said guide tube;

a lever of each of said locking means;

a first roller of said locking means, coupled to said lever;

grooves in a number corresponding to that of said locking means, provided in said guide tube;

axles of each of said locking means, received in said grooves;

said levers with said rollers being mounted on said axles;

a first ring groove provided in said bar;

said first roller interacting with said first ring groove;

a second ring groove provided in said casing of said bar;

said second roller interacting with said second ring groove;

a first stop provided on said bar;

a second stop provided on said guide tube;

said stops interacting with each other and effecting said coupling of said mechanism for driving said bar to said guide tube.

14. A drive of a regulating rod of a nuclear reactor as claimed in claim 12, including an interlocking means to provide a required clearance between said regulating rod and said drive in the course of recharging said nuclear reactor, which kinematically couples said mechanism for driving said bar to said mechanism for controlling said profiled grips.

15. A drive of a regulating rod of a nuclear reactor as claimed in claim 12, wherein the interlocking means comprises
   a casing;
   a first claw-type half-clutch rigidly mounted inside said casing on said driven element of said disengaging means;
   a second claw-type half-clutch movably mounted inside said casing on said driving element of said disengaging means, said second half-clutch being movable in the axial direction;
   a control bushing fitted over said second half-clutch and having an outer surface;
   at least two helical grooves provided on said outer surface of said control bushing;
   guide pins in a number corresponding to that of said helical grooves, fixed in said casing and received in said helical grooves;
   a ball lock;
   said ball lock coupling said control bushing to said second half-clutch;
   end-face teeth provided in said control bushing;
   said end-face teeth coupling said control bushing to said guide tube of said mechanism for controlling said profiled grips.

16. A drive of a regulating rod of a nuclear reactor as claimed in claim 13, including an interlocking means to provide a required clearance between said regulating rod and said drive in the course of recharging said nuclear reactor, which kinematically couples said mechanism for driving said bar to said mechanism for controlling said profiled grips.

17. A drive of a regulating rod of a nuclear reactor as claimed in claim 13, wherein said interlocking means comprises:
   a casing;
   a first claw-type half-clutch rigidly mounted inside said casing on said driven element of said disengaging means;
   a second claw-type half-clutch movably mounted inside said casing on said driving element of said disengaging means, said second half-clutch being movable in the axial direction;
   a control bushing fitted over said second half-clutch and having an outer surface;
   at least two helical grooves provided on said outer surface of said control bushing;
   guide pins in a number corresponding to that of said helical grooves, fixed in said casing and received in said helical grooves;
   a ball lock;
   said ball lock coupling said control bushing to said second half-clutch;
   end-face teeth provided in said control bushing;
   said end-face teeth coupling said control bushing to said rotary tube of said mechanism for controlling said profiled grips.

18. A drive of a regulating rod of a nuclear reactor as claimed in claim 16, wherein said interlocking means comprises:
   a casing;
   a first claw-type half-clutch rigidly mounted inside said casing on said driven element of said disengaging means;
   a second claw-type half-clutch movably mounted inside said casing on said driving element of said disengaging means said second half-clutch being movable in the axial direction;
   a control bushing fitted over said second half-clutch and having an outer surface;
   at least two helical grooves provided on said outer surface of said control bushing;
   guide pins in a number corresponding to that of said helical grooves, fixed in said casing and received in said helical grooves;
   a ball lock;
   said ball lock coupling said control bushing to said second half-clutch;
   end-face teeth provided in said control bushing;
   said end-face teeth coupling said control bushing to said rotary tube of said mechanism for controlling said profiled grips.

* * * * *